(12) United States Patent
You et al.

(10) Patent No.: US 12,177,921 B2
(45) Date of Patent: Dec. 24, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Xin You, Dongguan (CN); Qianxi Lu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 495 days.

(21) Appl. No.: 17/479,772

(22) Filed: Sep. 20, 2021

(65) Prior Publication Data

US 2022/0007449 A1 Jan. 6, 2022

Related U.S. Application Data

(63) Continuation of application No. PCT/CN2019/079356, filed on Mar. 22, 2019.

(51) Int. Cl.
*H04W 76/19* (2018.01)
*H04W 24/08* (2009.01)
*H04W 76/25* (2018.01)

(52) U.S. Cl.
CPC .......... *H04W 76/19* (2018.02); *H04W 24/08* (2013.01); *H04W 76/25* (2018.02)

(58) Field of Classification Search
CPC ...... H04W 76/19; H04W 24/08; H04W 76/25
See application file for complete search history.

(56) References Cited

U.S. PATENT DOCUMENTS

| | | | |
|---|---|---|---|
| 2008/0014946 A1 | 1/2008 | Kubota | |
| 2010/0279695 A1* | 11/2010 | Amirijoo | H04W 36/0079 455/438 |
| 2012/0064886 A1 | 3/2012 | Kim et al. | |
| 2015/0271867 A1 | 9/2015 | Lee et al. | |
| 2021/0120618 A1* | 4/2021 | Lee | H04W 76/19 |

FOREIGN PATENT DOCUMENTS

| | | |
|---|---|---|
| CN | 102123381 A | 7/2011 |
| CN | 102695222 A | 9/2012 |
| CN | 108684218 A | 10/2018 |
| JP | 2008022181 A | 1/2008 |
| WO | 2017183884 A1 | 10/2017 |
| WO | 2018014783 A1 | 1/2018 |

(Continued)

OTHER PUBLICATIONS

The EESR of corresponding European application No. 19921034.5, dated Feb. 21, 2022.

(Continued)

*Primary Examiner* — Sulaiman Nooristany
(74) *Attorney, Agent, or Firm* — Ladas & Parry, LLP

(57) ABSTRACT

A wireless communication method, a terminal device, and a network device, the method including: a terminal device sends indication information to a first network device, where the indication information is used to indicate that the terminal device fails to switch to a second network device.

8 Claims, 7 Drawing Sheets

(56) References Cited

FOREIGN PATENT DOCUMENTS

| WO | 2018175719 A1 | 9/2018 |
|---|---|---|
| WO | 2020191554 A1 | 10/2020 |

OTHER PUBLICATIONS

Qualcomm Incorporated:"3GPP TSG-RAN WG2 Meeting #105; RLM and RLF handling during LTE enhanced MBB HO" 3GPP Draft: R2-1900789, 3rd Generation Partnership Project (3GPP), Mobile Competence Centre; 650, Route Des Lucioles; F-06921 Sophia-Antipolis Cedex, France. vol. RAN WG2, No. Athens, Greece; Feb. 25, 2019-Mar. 1, 2019 Feb. 15, 2019(Feb. 15, 2019), XP051602164, entire document.
OPPO:"3GPP TSG-RAN WG2 Meeting #105; Discussion on failure handling of handover", 3GPP Draft; R2-1900860, 3rd Generation Partnership Project (3GPP), Mobile Competence Centre; 650, Route Des Lucioles; F-06921 Sophia-Antipolis Cedex; FR, vol. RAN WG2, No. Athens, Greece; Feb. 25, 2019-Mar. 1, 2019 Feb. 15, 2019(Feb. 15, 2019), XP051602231, entire document.
Qualcomm Incorporated:"3GPP TSG-RAN WG2 Meeting #105; R2-1900792; Key metrics analysis for LTE HO architecture solution discussion", 3GPP Draft; R2-1900792, 3rd Generation Partnership Project (3GPP), Mobile Competence Centre; 650, Route Des Lucioles; F-06921 Sophi, vol. RAN WG2, No. Athens, Greece; Feb. 25, 2019-Mar. 1, 2019 Feb. 15, 2019(Feb. 15, 2019), XP051602167, entire document.
The first Office Action of corresponding Indian application No. 202117046494, dated Mar. 22, 2022.
International Search Report (ISR) dated Oct. 30, 2019 for Application No. PCT/CN2019/079356.
Written Opinion of the International Searching Authority for Application No. PCT/CN2019/079356, mailed on Oct. 30, 2019 with English translation provided by Google Translate.
Qualcomm Incorporated, "Control Plane handling and procedures to support Make-Before-Break (MBB) HO", R2-1900358, 3GPP TSG-RAN WG2 Meeting #105, Athens, Greece, Feb. 25-Mar. 1, 2019, all pages.
The Notice of Allowance of corresponding Japanese patent application No. 2021-556923, dated Jun. 20, 2023 and its English translation provided by applicant's foreign counsel.
The first Office Action of corresponding Japanese application No. 2021-556923, dated Jan. 24, 2023.
The first Office Action and search report of corresponding Chinese application No. 202111056939.6, dated Dec. 9, 2022.
ETRI, "Details on S-RLF in Dual Connectivity", R2-144420, 3GPP TSG-RAN2 Meeting #87bis, Shanghai, China, Oct. 6-10, 2014, all pages.
Nokia, Nokia Shanghai Bell, "Non-split bearer solution for reducing the service interruption time in HO", R2-1817691, 3GPP TSG-RAN WG2 Meeting #104, Spokane, US, Nov. 12-16, 2018, all pages.
Qualcomm Incorporated, "LTE Mobility Robustness Enhancements", R2-1900788, Revision of R2-1817829, 3GPP TSG-RAN WG2 Meeting #105, Athens, Greece, Feb. 25-Mar. 1, 2019, all pages.
The second Office Action of corresponding Canadian application No. 3134505 dated Sep. 19, 2023.
The first Office Action of corresponding Vietnam application No. 1-2021-06686 dated Aug. 28, 2020.
The first Office Action of corresponding Korean application No. 10-2021-7032265 dated Jun. 19, 2024.

* cited by examiner

400

A terminal device sends indication information to the first network device, where the indication information is used to indicate that the terminal device fails to switch to the second network device ⟩ S410

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2019/079356, filed on Mar. 22, 2019, the disclosure of which is hereby incorporated by reference in its entirety.

TECHNICAL FIELD

The embodiments of the present application relate to the field of communications, in particular to a wireless communication method, terminal device, and network device.

BACKGROUND

A new radio (NR) system supports cell handover, for example, when a terminal device moves from one cell to another, or due to adjustments on wireless communication traffic loads, activation operation and maintenance, device failures, etc., in order to ensure the continuity of communication and the quality of service, it is necessary to transfer a communication link between the terminal device and a source base station to a target base station, that is, perform a handover process.

However, if the terminal device fails to access the target base station, the terminal device also needs to initiate a radio resource control (RRC) connection reestablishment process to perform normal data transmission, which increases data transmission delays.

SUMMARY

The embodiments of the present application provide a wireless communication method, a terminal device, and a network device, which are beneficial to avoid data interruption during a handover process, thereby reducing data transmission delays.

In a first aspect, a wireless communication method is provided, including: sending, by a terminal device, indication information to a first network device, where the indication information is used to indicate that the terminal device fails to switch to a second network device.

In a second aspect, a wireless communication method is provided, including: determining, by a first network device, that a terminal device fails to switch to a second network device; and maintaining, by the first network device, a connection with the terminal device.

In a third aspect, a terminal device is provided, which is configured to execute the foregoing first aspect or any possible implementation of the first aspect. Specifically, the terminal device includes a unit for executing the method of the foregoing first aspect or the method in any possible implementation of the first aspect.

In a fourth aspect, a network device is provided, which is configured to execute the foregoing second aspect or any possible implementation of the second aspect. Specifically, the network device includes a unit for executing the method of the foregoing second aspect or the method in any possible implementation of the second aspect.

In a fifth aspect, a terminal device is provided, where the terminal device includes a processor and a memory. The memory is configured to store a computer program, and the processor is configured to call and run the computer program stored in the memory to execute the method in the foregoing first aspect or the method in each implementation thereof.

In a sixth aspect, a network device is provided, where the network device includes a processor and a memory. The memory is configured to store a computer program, and the processor is configured to call and run the computer program stored in the memory to execute the method in the foregoing second aspect or the method in each implementation thereof.

In a seventh aspect, a chip is provided, which is configured to implement the method of any one of the foregoing first aspect to the second aspect or the method in each implementation thereof.

Specifically, the chip includes: a processor, configured to call and run a computer program from the memory, so as to enable a device installed with the chip to execute the method of any one of the foregoing first aspect to the second aspect or the method in each implementation thereof.

In an eighth aspect, a computer readable storage medium is provided for storing a computer program that enables a computer to execute the method of any one of the foregoing first aspect to the second aspect or the method in each implementation thereof.

In a ninth aspect, a computer program product is provided, including computer program instructions that enable a computer to execute any one of the foregoing first to second aspects or the method in each implementation thereof.

In a tenth aspect, a computer program is provided, which when run on a computer, enables the computer to execute any one of the foregoing first to second aspects or the method in each implementation thereof.

Based on the above technical solution, after a terminal device fails to access a target network device, there is no need to initiate an RRC connection reestablishment process. Instead, the terminal device can send to a source network device indication information indicating that the terminal device fails to access the target network device, and the terminal device maintains a connection with the source network device, so that the source network device can acquire connection status of the terminal device. Further, the source network device can continue using the established connection to communicate with the terminal device, thereby reducing data transmission delays.

DETAILED DESCRIPTION OF EMBODIMENTS

The technical solutions in the embodiments of the present application are described below in conjunction with the drawings in the embodiments of the present application. Obviously, the described embodiments are a part of the embodiments of the present application, not all of the embodiments. Based on the embodiments in the present application, all other embodiments obtained by those of ordinary skill in the art without paying creative work shall fall within the protection scope of the present application.

The technical solutions in the embodiments of the present application can be applied to various communication systems, such as: a global system of mobile (GSM) communication system, a code division multiple access (CDMA) system, a wideband code division multiple access (WCDMA) system, general packet radio service (GPRS) system, a long term evolution (LTE) system, an LTE frequency division duplex (FDD) system, LTE time division duplex (TDD) system, a universal mobile telecommunication system (UMTS), a worldwide interoperability for microwave access (WiMAX) communication system or 5G system, etc.

Figure 1:
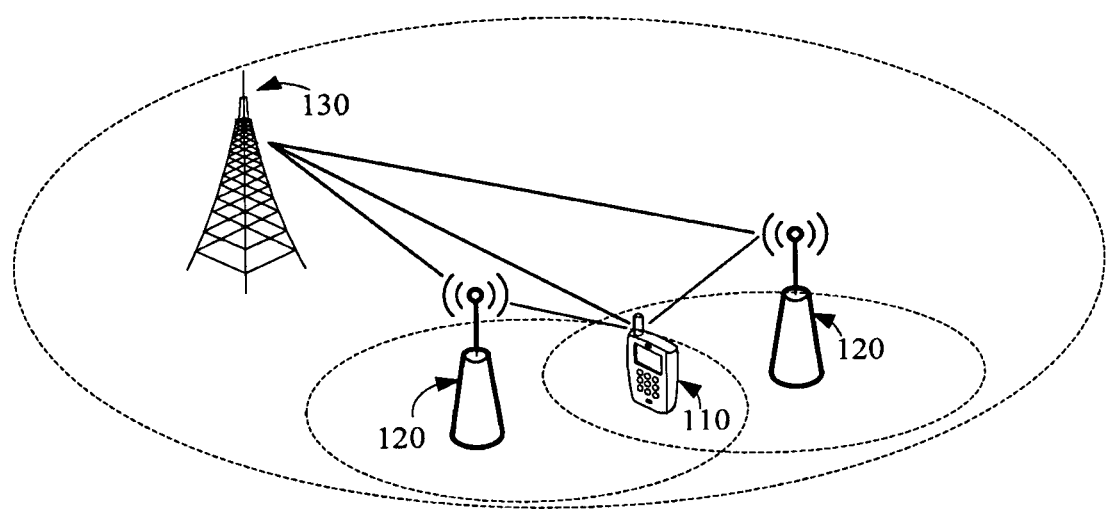
FIG. 1 shows a schematic diagram of an application scenario of an embodiment of the present application.

FIG. 1 is a schematic structural diagram of a communication system 100 to which an embodiment of the present application is applied.

As shown in FIG. 1, a terminal device 110 is connected to a first network device 130 in a first communication system and a second network device 120 in a second communication system. For example, the first network device 130 is a network device under long term evolution (LTE), the second network device 120 is a network device under new radio (NR).

The first network device 130 and the second network device 120 may include multiple cells.

It should be understood that FIG. 1 is an example of a communication system in an embodiment of the present application, and the embodiment of the present application is not limited to that shown in FIG. 1.

As an example, the communication system to which the embodiment of the present application is adapted may include at least multiple network devices under the first communication system and/or multiple network devices under the second communication system.

For example, the system 100 shown in FIG. 1 may include one main network device under the first communication system and at least one auxiliary network device under the second communication system. The at least one auxiliary network device is respectively connected to the one main network device to form multiple connections, and is connected to the terminal device 110 respectively to provide services therefor. Specifically, the terminal device 110 may simultaneously establish connections through the main network device and the auxiliary network device.

In some embodiments, the connection established between the terminal device 110 and the main network device is a main connection, and the connection established between the terminal device 110 and the auxiliary network device is an auxiliary connection. The control signaling of the terminal device 110 may be transmitted through the main connection, and the data of the terminal device 110 may be transmitted through the main connection and the auxiliary connection at the same time, or may be transmitted simply through the auxiliary connection.

As another example, the first communication system and the second communication system in the embodiments of the present application are different, but specific types of the first communication system and the second communication system are not limited.

For example, the first communication system and the second communication system may be various kinds of communication systems, such as: global system of mobile communication (GSM) systems, code division multiple access (CDMA) systems, wideband code division multiple access (WCDMA) systems, general packet radio service (GPRS) systems, long term evolution (LTE) systems, LTE time division duplex (TDD) systems, universal mobile telecommunication systems (UMTS), etc.

The main network device and the auxiliary network device may be any access network device.

In some embodiments, the access network device may be a base transceiver station (BTS) in a global system of mobile communication (GSM) system or a code division multiple access (CDMA), it can also be a Node B (NB) in a wideband code division multiple access (WCDMA) system, or an evolutional Node B (eNB or eNodeB) in a long term evolution (LTE) system.

In some embodiments, the access network device may also be a next generation radio access network (NG RAN), or a base station (gNB) in an NR system, or a cloud radio access network (CRAN) wireless controller, or the access network device may be a relay station, an access point, a vehicle-mounted device, a wearable device, or a network device in a public land mobile network (PLMN) of the future evolution, etc.

In the system 100 shown in FIG. 1, as an example, the first network device 130 is taken as a main network device, and the second network device 120 is taken as an auxiliary network device.

The first network device 130 may be an LTE network device, and the second network device 120 may be an NR network device. Or, the first network device 130 may be an NR network device, and the second network device 120 may be an LTE network device. Or both of the first network device 130 and the second network device 120 may be NR network devices. Or, the first network device 130 may be a GSM network device, a CDMA network device, etc., and the second network device 120 may also be a GSM network device, a CDMA network device, etc. Or the first network device 130 may be a microcell, and the second network device 120 may be a microcell, a picocell, a femtocell, etc.

In some embodiments, the terminal device 110 may be any terminal device, and the terminal device 110 includes but is not limited to:

being connected via a wired line, such as being connected via a public switched telephone network (PSTN), a digital subscriber line (DSL), a digital cable, a direct cable; and/or being connected via another data network; and/or being connected via a wireless interface, such as a cellular network, a wireless local area network (WLAN), a digital television network such as a Digital Video Broadcasting-Handheld (DVB-H) network, a satellite network, an Amplitude Modulation-Frequency Modulation (AM-FM) broadcast transmitter; and/or being connected via an apparatus of another terminal device which is configured to receive/send a communication signal; and/or being connected via an Internet of Things (IoT) device. A terminal device configured to communicate through a wireless interface may be referred to as a "wireless communication terminal", a "wireless terminal" or a "mobile terminal". Examples of mobile terminals include, but are not limited to, satellite or cellular phones; personal communications system (PCS) terminals that can combine cellular radio phones with data processing, fax, and data communication capabilities; may include Personal Digital Assistant (PDA) with a radio phone, a pager, Internet/intranet with internet access, a Web browser, a memo pad, a calendar, and/or a global positioning system (GPS) receiver; as well as a conventional laptop and/or palmtop receiver or others electronic devices including radio telephone transceivers. A terminal device can refer to an access terminal, a user equipment (UE), a user unit, a user station, a mobile station, a mobile platform, a remote station, a remote terminal, a mobile device, a user device, a terminal, a wireless communication equipment, a user agent, or a user apparatus. The access terminal can be a cellular phone, a cordless phone, a session initiation protocol (SIP) phone, a wireless local loop (WLL) station, a personal digital assistant (PDA), a handheld device with wireless communication functions, a computing device or other processing devices connected to wireless modems, an in-vehicle device, a wearable device, a terminal device in a 5G network, or a terminal device in the future evolution of PLMN, etc.

It should be understood that the terms "system" and "network" are often used interchangeably herein.

In the embodiments of the present application, the network device provides services for the cell, and the terminal device communicates with the network device through a transmission resource (for example, a frequency domain resource, or a spectrum resource) used by the cell, and the cell may be a cell corresponding to a network device (such as a base station), the cell can belong to a macro base station, or belong to a base station corresponding to a small cell. The small cell here may include: metro cell, micro cell, pico cell, femto cell, etc. These small cells have the characteristics of small coverage and low transmit power, and are suitable for providing high-rate data transmission services.

It should be understood that the method in the embodiments of the present application can be used to transmit various types of services.

For example, enhance mobile broadband (eMBB), eMBB targets users to obtain multimedia content, services, and data, and its demand is growing rapidly. For another example of eMBB, since eMBB may be deployed in different scenarios, such as indoors, urban areas, and rural areas, the differences in capabilities and requirements thereof are relatively large. Therefore, detailed analysis can be performed in conjunction with specific deployment scenarios. For another example of Ultra-reliable and Low Latency Communication (URLLC), typical applications of URLLC include: industrial automation, power automation, telemedicine operations (surgery), traffic safety protection, etc. Typical characteristics of massive machine type of communication (mMTC) include: high connection density, small data volume, delay-insensitive services, low-cost modules and long service life.

Figure 2:
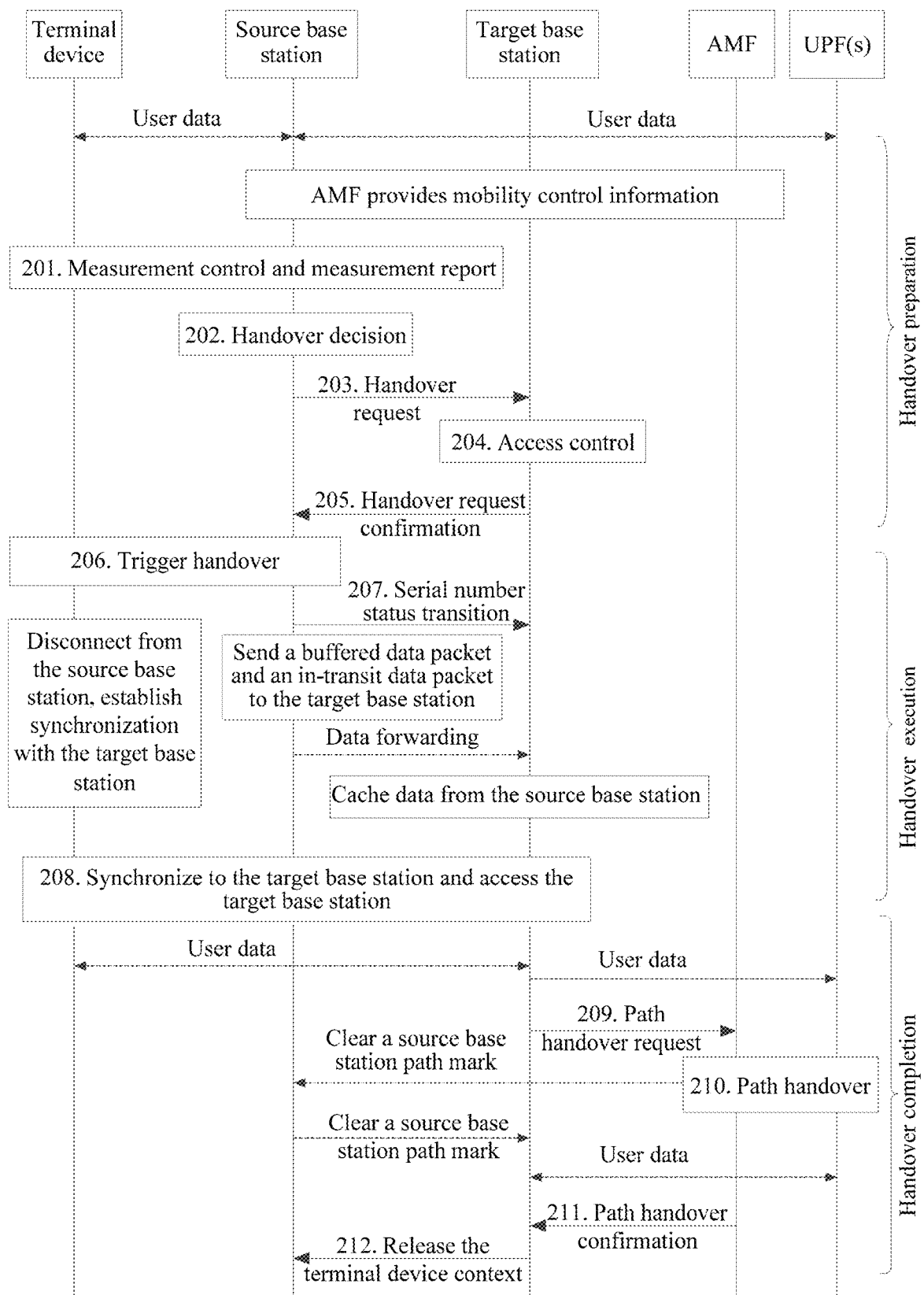
FIG. 2 shows a schematic interaction diagram of a switching mode.

It should be understood that similar to an LTE system, an NR system supports the handover process. For example, as shown in FIG. 2, the entire handover process is divided into the following three stages:

(1) Handover preparation stage: including measurement control and reporting, handover request and confirmation;

(2) Handover execution phase: the UE immediately executes the handover process after receiving the handover command, that is, the UE disconnects with a source cell and connects to a target cell (such as performing random access, sending a (radio resource control, RRC) handover complete message to the target base station, etc.); SN state transferring, data forwarding;

(3) Handover completion stage: the target cell executes Path Switch with an AMF and a UPF to release a UE context of the source base station.

Specifically, as shown in FIG. 2, the handover preparation phase (201~205) may include:

in 201, the source base station triggers the terminal device to perform neighboring cell measurement, so that the terminal device can measure the neighboring cell and report a measurement result to the source base station;

in 202, the source base station evaluates the measurement result reported by the terminal device and decides whether to trigger a handover;

in 203, if determining to trigger a handover, the source base station can send a handover request to the target base station;

in 204, after receiving the handover request sent by the source base station, the target base station can start admission according to service information carried by the source base station, and perform radio resource configuration; and in 205, the target base station sends a handover request confirmation message to the source base station, so as to return an admission result and radio resource configuration information in the target base station to the source base station. At this point, the handover preparation phase is complete.

The second stage, the handover execution stage (206~208) may include:

in 206, after receiving the handover request confirmation message of the target base station, the source base station can be triggering the terminal device to perform handover; and in 207, the source base station can forward a buffered data, an in-transit data packet, a system serial number of data, etc., to the target base station. And, the target base station can buffer data received from the source base station.

In addition, the terminal device can disconnect from the source base station and establish synchronization with the target base station.

In 208, the terminal device synchronizes to the target base station. At this point, the handover execution phase is complete.

The third stage, the handover completion stage (209~212) may include:

in 209, the target base station sends a path handover request to an access and mobility management function (AMF);

in 210, after receiving the path handover request of the target base station, the AMF performs path handover with a user plane function (UPF) to clear a path mark of a user plane of the source base station;

in 211, after the path handover is completed, the AMF may send a path handover confirmation message to the target base station; and in 212, the target base station sends a terminal device context release message to the source base station to notify the source base station that the handover is successful, and triggers a source base station terminal device context. At this point, the handover is complete.

The terminal device immediately starts a T304 timer after receiving the handover command, and starts downlink synchronization to the target cell, acquires master information block (MIB) information of the target cell, and then initiates random access. During the random access procedure, multiple preamble retransmissions are allowed until the random access is successful. Further, if the T304 timer expires, indicating that the handover fails, the terminal device can directly trigger an RRC connection reestablishment process.

In the embodiments of the present application, in some conditional handover scenarios, for example, for high-speed mobile scenarios and high-frequency deployment scenarios, there are problems of frequent handovers and handovers being prone to failure. Consider introducing a handover process based on conditional triggering, the fundamental principle is: according to conditions configured by a network side, the terminal device performs handover to the target cell (that is, triggers the random access procedure and sends a handover complete message) when determining that the conditions related to the target cell meet the configured conditions, thus avoiding the problem that it is too late or unable to send measurement reports and receive handover commands due to high-speed movement into a poor coverage area.

Figures 3, 4:
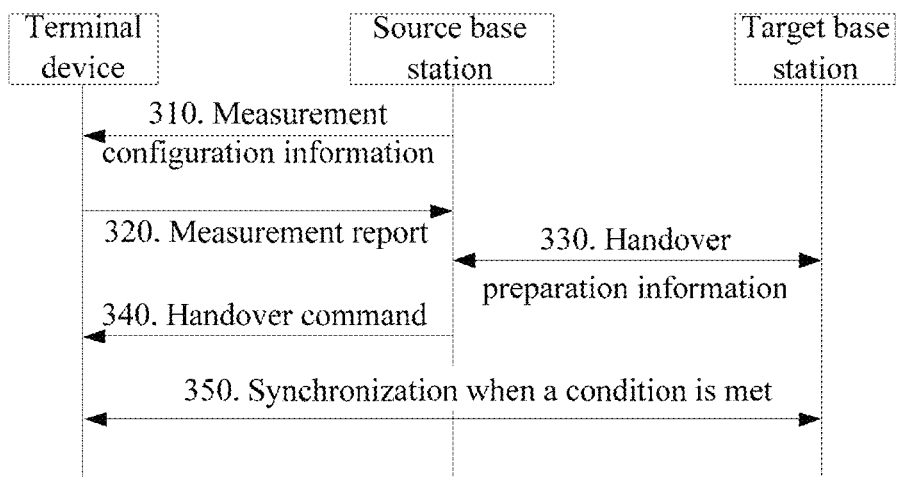
FIG. 3 shows a schematic interaction diagram of another switching mode.
FIG. 4 shows a schematic flowchart of a wireless communication method according to an embodiment of the present application.

Specifically, the handover process based on conditional triggering may be as shown in FIG. 3, and the handover process based on conditional triggering includes:

310, the source base station sends measurement configuration information to the terminal device;

320, the terminal device sends a measurement report to the source base station;

330, the source base station and the target base station exchange handover preparation information;

340, the source base station sends a handover command to the terminal device;

the handover command includes condition information for the cell or beam; and 350, when the condition is met, the terminal device synchronizes with the target base station (that is, the terminal device accesses the target base station).

However, if the terminal device fails to access the target base station, in this case, how to perform the data transmission of the terminal device, especially the delay-sensitive business, is a problem that needs to be solved urgently.

FIG. 4 is a schematic flowchart of a wireless communication method 400 provided by an embodiment of the present application.

S410: a terminal device sends indication information to a first network device, where the indication information is used to indicate that the terminal device fails to switch to a second network device.

It should be understood that the first network device may be a network device that is currently connected to the terminal device, that is, a source network device, and the second network device is a network device to be accessed by the terminal device, that is, a target network device.

In some embodiments, the indication information may only indicate that the terminal device fails to access the second network device. When the first network device receives the indication information, the first network device may consider the terminal device maintains a connection with the first network device, so that the first network device can resume the connection with the terminal device.

In some embodiments, the indication information may indicate that the terminal device fails to access the second network device, and the terminal device maintains a connection with the first network device. When the first network device receives the indication information, the first network device may determine that the terminal device fails to access the second network device and the terminal device maintains the connection with the first network device, so that the first network device can resume the connection with the terminal device.

It should be understood that whether the terminal device fails to access the second network device and whether the terminal device maintains the connection with the first network device can be combined in an indication, for example, the above two pieces of information can be indicated by one piece of indication information, or they can be indicated separately; for example, two pieces of indication information are used to indicate the above two pieces of information respectively, or only one piece of the information can be indicated, and the other piece of information may be determined based on the one piece of information; for example, only whether the terminal device fails to access the second network device may be indicated, in the case of failure, the first network device may consider that the terminal device maintains the connection with the first network device; or only whether the terminal device maintains the connection with the first network device may be indicated, the terminal device may determine whether the terminal device fails to access the second network device, based on whether the terminal device maintains the connection with the first network device, for example, if the terminal device maintains the connection with the first network device, the first network device may determine that the terminal device has failed to access the second network device, otherwise, the first network device may determine that the terminal device has successfully accessed the second network device. The embodiment of the present application does not limit the specific indication manner. Hereinafter, an example is described where the indication information indicates that the terminal device fails to access the second network device, which should not constitute any limitation to embodiments of the present application.

Therefore, after failing to access the target network device, the terminal device does not need to initiate the RRC connection reestablishment process, instead, the terminal device can send indication information to the source network device to indicate that the terminal device fails to access the target network device, and the terminal device maintains the connection with the source network device, in this way, the source network device can learn connection status of the terminal device. Further, the source network device can quickly resume the connection with the terminal device, that is, the source network device can continue using the previously established connection with the terminal device for communication, thereby avoiding interruption of data transmission and reducing data transmission delays.

In some embodiments, the terminal device may notify the first network device through explicit signaling that the terminal device fails to access the second network device. As an example rather than a limitation, the indication information is included in at least one of the following signaling:

radio resource control RRC signaling, a media access control MAC control element CE and uplink control information UCI.

For example, the terminal device may send RRC signaling to the first network device, and the indication information is included in the RRC signaling. In some embodiments, the indication information may be carried in a reserved bit of the RRC signaling, or it is also possible to add a new field in the RRC signaling to carry the indication information. The embodiment of the present application does not limit the specific carrying manner.

For another example, the terminal device may send a media access control (MAC) control element (CE) to the first network device, where the MAC CE includes the indication information. In some embodiments, the indication information may be carried in a reserved bit or a stuffing bit of the MAC CE, or a new field may be added to the MAC CE to carry the indication information. The embodiment of the present application does not limit the specific carrying manner.

For further another example, the terminal device may send uplink control information (UCI) to the first network device, where the UCI includes the indication information. In some embodiments, the indication information may be carried in a reserved bit of the UCI, or a new field may also be added to the UCI to carry the indication information. The embodiment of the present application does not limit the specific carrying manner.

It should be noted that the terminal device may include the indication information in other explicit signaling (for example, other uplink control signaling), which is not limited in the embodiment of the present application.

In some specific embodiments, the signaling used to carry the indication information may be newly added signaling, for example, newly added RRC signaling, a newly added MAC CE, or newly added UCI, etc. The newly added signaling is used to indicate to the source network device that the terminal device fails to switch to the target network device.

In other specific embodiments, the signaling used to carry the indication information may also be existing signaling, for example, existing RRC signaling may be, as an example rather than a limitation, an RRC reconfiguration complete message or other RRC messages; or existing MAC CE, for example, a scheduling request (SR) or a buffer status report (BSR), etc.; or existing UCI, etc. By reusing existing signaling to carry the indication information, signaling overhead can be saved.

In other embodiments, the terminal device may also notify the first network device through implicit signaling that the terminal device fails to access the second network device.

In some embodiments, the implicit signaling may be uplink control signaling, for example, an uplink RRC message, a MAC CE or UCI, that is, the indication information may be an uplink RRC message, a MAC CE or UCI.

In some embodiments, the uplink RRC message may be an RRC reconfiguration complete message or other RRC messages, which are not limited in the embodiment of the present application.

In some embodiments, the MAC CE may be a MAC CE sent by a terminal device such as an SR or a BSR to the network device, which is not limited in the embodiment of the present application.

In other embodiments, the implicit signaling may be uplink data, that is, the indication information may be uplink data.

Generally speaking, during the handover process, the terminal device will not send uplink RRC messages or uplink data to the source network device. If during the handover process, the first network device receives the uplink RRC message or uplink data sent by the terminal device, the first network device can consider that the terminal device fails to switch to the target network device and falls back to the source network device, that is, the first network device can continue using the previously established connection with the terminal device for communication without having to reestablish a connection.

In the embodiment of the present application, the method further includes:

the terminal device receives a handover command sent by the first network device;

where the handover command may be used to indicate that the terminal device is switched to the second network device.

In some embodiments, the handover command may also indicate a type of the handover, for example, a handover based on eMBB, a handover based on a non-split bearer, or a handover based on 0ms interruption (0ms interruption), etc. In the above-mentioned types of handover processes, the terminal device maintains the connection with the source network device and at the same time initiates a handover to the target network device.

In some embodiments, the uplink control signaling or the uplink data may be sent after the terminal device receives the handover command sent by the first network device, for example, the uplink control signaling or the uplink data may be sent during the handover process of the terminal device to the second network device, or may also be sent after the terminal device fails to switch to the second network device.

The sending of the uplink data is taken as an example. The uplink data may be sent immediately after the handover command of the first network device is received, or may also be sent within a period of time after the handover command is received. In some embodiments, the period of time may be measured by a timer. For example, a start condition of the timer may be the reception of the handover command, and a duration of the timer may be determined based on a duration of the terminal device accessing the second network device and/or an effective time for the terminal device to access a resource used by the second network device, then the terminal device is performing a handover process to the second network device within the duration of the timer. If in this process, the terminal device sends uplink data to the first network device, it can be considered that the terminal device fails to switch to the second network device and falls back to the first network device.

In some specific embodiments, the timer may be implemented by using an existing T304 timer. For a detailed description of the T304 timer, reference may be made to the related description of the embodiment shown in FIG. 2.

In the embodiment of the present application, during the process in which the terminal device is switched to the second network device, the terminal device maintains the connection with the first network device. In this way, if the terminal device fails to switch to the second network device, the terminal device can also fall back to the first network device and continue using the established connection with the first network device for communication, which is beneficial to avoid interruption of data transmission of the terminal device.

In some embodiments, the terminal device maintains the connection with the first network device may include:

the terminal device maintains a connection of a radio bearer with the first network device.

That is, the terminal device can maintain the connection of the radio bearer, and continue using the previously established radio bearer to communicate with the first network device.

In some embodiments, the radio bearer may include a signaling radio bearer (SRB) and/or a data radio bearer (DRB).

In some embodiments, the terminal device maintains the connection with the first network device may include:

the terminal device suspends a connection of a radio bearer with the first network device.

That is, the terminal device may continue maintaining the connection of the radio bearer, but suspend using the radio bearer to communicate with the first network device.

For example, the terminal device can maintain the SRB connection with the first network device, and at the same time maintain the DRB connection with the first network device, that is, the terminal device can continue using the SRB to perform signaling interaction with the first network device, and continue using the DRB to perform data interaction with the first network device.

For another example, the terminal device can maintain the SRB connection with the first network device, and at the same time suspend the DRB connection with the first network device, that is, the terminal device can continue using the SRB to perform signaling interaction with the first network device, and suspend using the DRB to perform data interaction with the first network device.

For another example, the terminal device can suspend the SRB connection with the first network device, and at the same time maintain the DRB connection with the first network device, that is, the terminal device may suspend using the SRB to perform signaling interaction with the first network device, and continue using the DRB to perform data interaction with the first network device.

In some cases, when the terminal device fails to switch to the second network device, the connection of which radio bearer is suspended may be pre-configured, or may be agreed with the source network device, or may be agreed in a protocol, for example, according to a pre-configuration, the SRB connection can be suspend and the DRB connection can be maintained, so as to ensure real-time data transmission, or the SRB connection and the DRB connection can be maintained at the same time, which is not limited in the embodiment of the present application.

In some embodiments, the first network device may determine that the terminal device falls back to the first network device after receiving the indication information sent by the terminal device, and further, the first network device can resume the suspended connection of the radio bearer. For example, if the SRB connection is suspended, the first network device can resume the SRB connection between the terminal device and the first network device.

In some embodiments, the method 400 may further include:

in a process in which the terminal device is switched to the second network device, the terminal device performs radio link monitoring RLM on the first network device to determine a wireless link condition of the first network device.

Further, the terminal device may determine whether to switch to the first network device according to the wireless link condition of the first network device.

For example, if the wireless link condition of the first network device meets a specific condition, for example, a channel quality of the first network device is greater than a preset quality threshold, the terminal device determines to switch to the first network device.

In some embodiments, the terminal device performs radio link monitoring RLM on the first network device includes: before meeting one of the following conditions, the terminal device keeps performing RLM on the first network device:

the terminal device successfully sending a message 1 (MSG1, or preamble sequence) for random access to the second network device;

the terminal device successfully receiving a message 2 (MSG2, or random access response) for random access sent by the second network device;

the terminal device successfully sending a message 3 (MSG3) for random access to the second network device;

the terminal device successfully receiving the message 4 (MSG4) for random access sent by the second network device.

It should be understood that if the terminal device successfully sends an MSG1 or an MSG3, or the terminal device successfully receives an MSG2 or an MSG3, it can be considered that the terminal device may successfully access the second network device. In this case, it can be suspended to perform RLM on the first network device. Before that, the terminal device may fail to access the second network device. That is, the terminal device may need to fall back to the first network device. Therefore, it is necessary to perform RLM on the first network device to determine whether the first network device meets an access condition.

It should be noted that, for non-competition-based random access, the terminal device may keep performing RLM on the first network device before successfully sending an MSG1 or successfully receiving an MSG2.

In some embodiments, the method 400 further includes:

the terminal device receives a handover command sent by the first network device, where the handover command includes an identifier of at least one target network device and an access condition corresponding to the at least one target network device, where the at least one target network device includes the second network device.

This step may correspond to 340 in FIG. 3. In some embodiments, the access condition corresponding to the at least one target network device may be condition information of a cell and/or a beam. The terminal device can measure the channel quality of the at least one target network device to determine whether the corresponding access condition is met, and if the corresponding access condition is met, the terminal device can initiate a random access procedure to the target network device. In some embodiments, the target network device is the second network device, and the terminal device may send the indication information which indicates that the terminal device fails to switch to the second network device to the first network device when failing in the random access procedure to the second network device.

Therefore, in the embodiment of the present application, after failing to access the target network device, the terminal device does not need to initiate the RRC connection reestablishment process, instead, the terminal device may send indication information to the source network device to indicate that the terminal device fails to access the target network device. In addition, the terminal device maintains the connection with the source network device, so that the source network device can learn the connection status of the terminal device. Further, the source network device can quickly resume the connection with the terminal device, that is, the source network device can continue using the previously established connection with the terminal device for communication, thereby avoiding data transmission interruption and reducing data transmission delays.

Hereinafter, in conjunction with FIG. 5 and FIG. 6, an example is presented where the first network device is taken as the source base station and the second network device is taken as the target base station, the wireless communication method according to the specific embodiment of the present application will be described.

Figure 5:
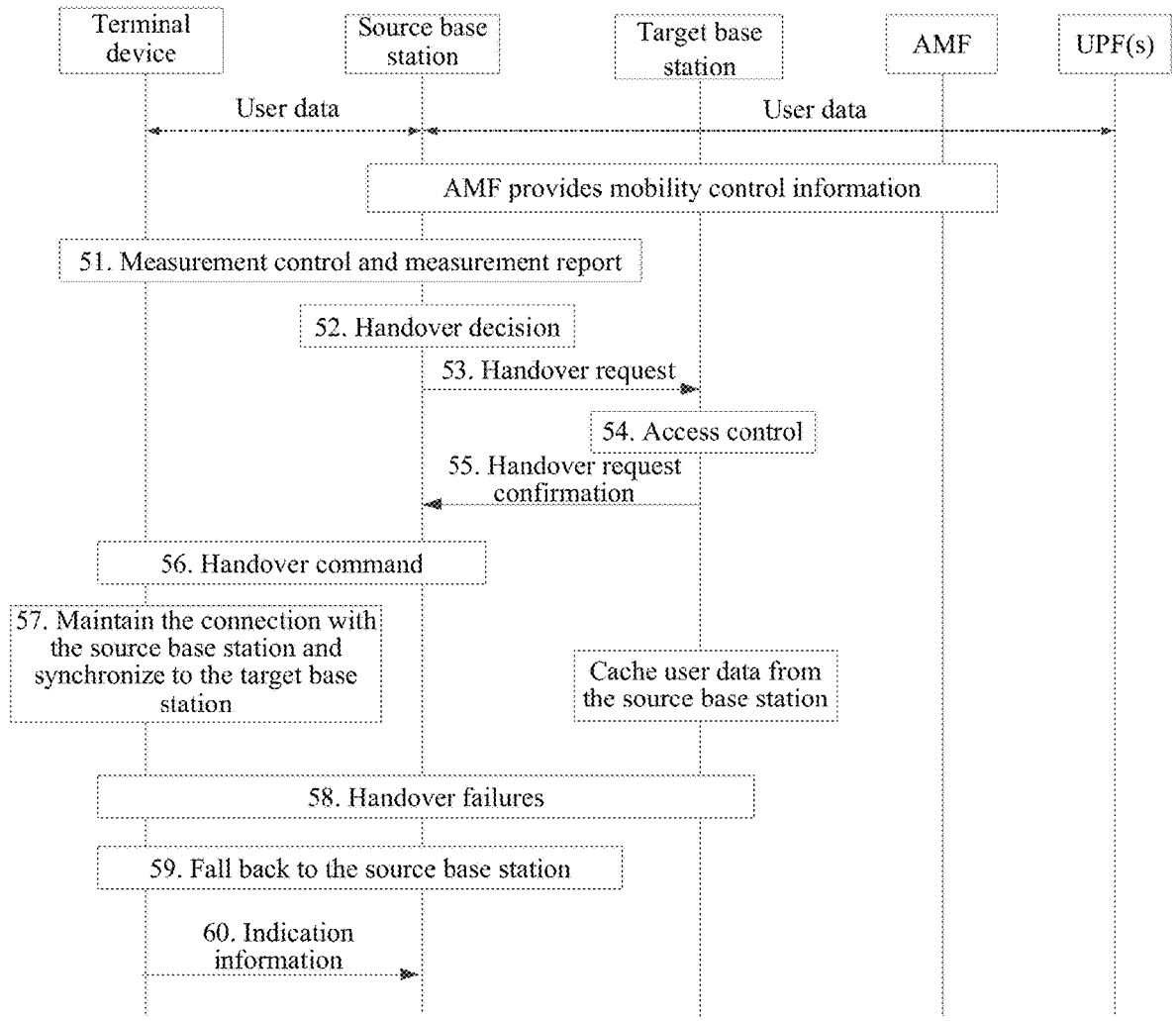
FIG. 5 shows a schematic interaction diagram of a wireless communication method according to an embodiment of the present application.

The embodiment shown in FIG. 5 can be applied to various handover scenarios, such as the handover based on the eMBB, the handover based on the non-split bearer, or the handover based on the Oms interruption, etc., as shown in FIG. 5, the method may include the following steps.

51 to 55 may correspond to 201 to 205 described in FIG. 2. For related description, please refer to the foregoing embodiment, and for the sake of brevity, details are not repeated here.

Further, in 56, the source base station sends a handover command to the terminal device for indicating the terminal device to switch to the target base station.

In 57, the terminal device maintains a connection with the source base station and synchronizes to the target base station.

In some embodiments, the terminal device may maintain the connection of the radio bearer with the source base station, or suspend the connection of the radio bearer with the source base station.

For example, the terminal device may continue using the SRB to perform signaling interaction with the source base station, and suspend using the DRB to perform data interaction with the source base station.

For another example, the terminal device may continue using the SRB to perform signaling interaction with the source base station, and continue using the DRB to perform data interaction with the source base station.

For another example, the terminal device may suspend using the SRB for signaling interaction with the source base station, and suspend using the DRB for data interaction with the source base station.

In 58, the terminal device fails to switch to the target base station.

In 59, the terminal device falls back to the source base station.

In 60, the terminal device sends indication information to the source base station.

For the specific implementation of the indication information, reference may be made to the relevant description above, which will not be repeated here.

In some embodiments, if in 57, the terminal device suspends the connection of the radio bearer with the source base station, after 60, the source base station may further resume the suspended connection of the radio bearer with the terminal device.

Figures 6, 7:
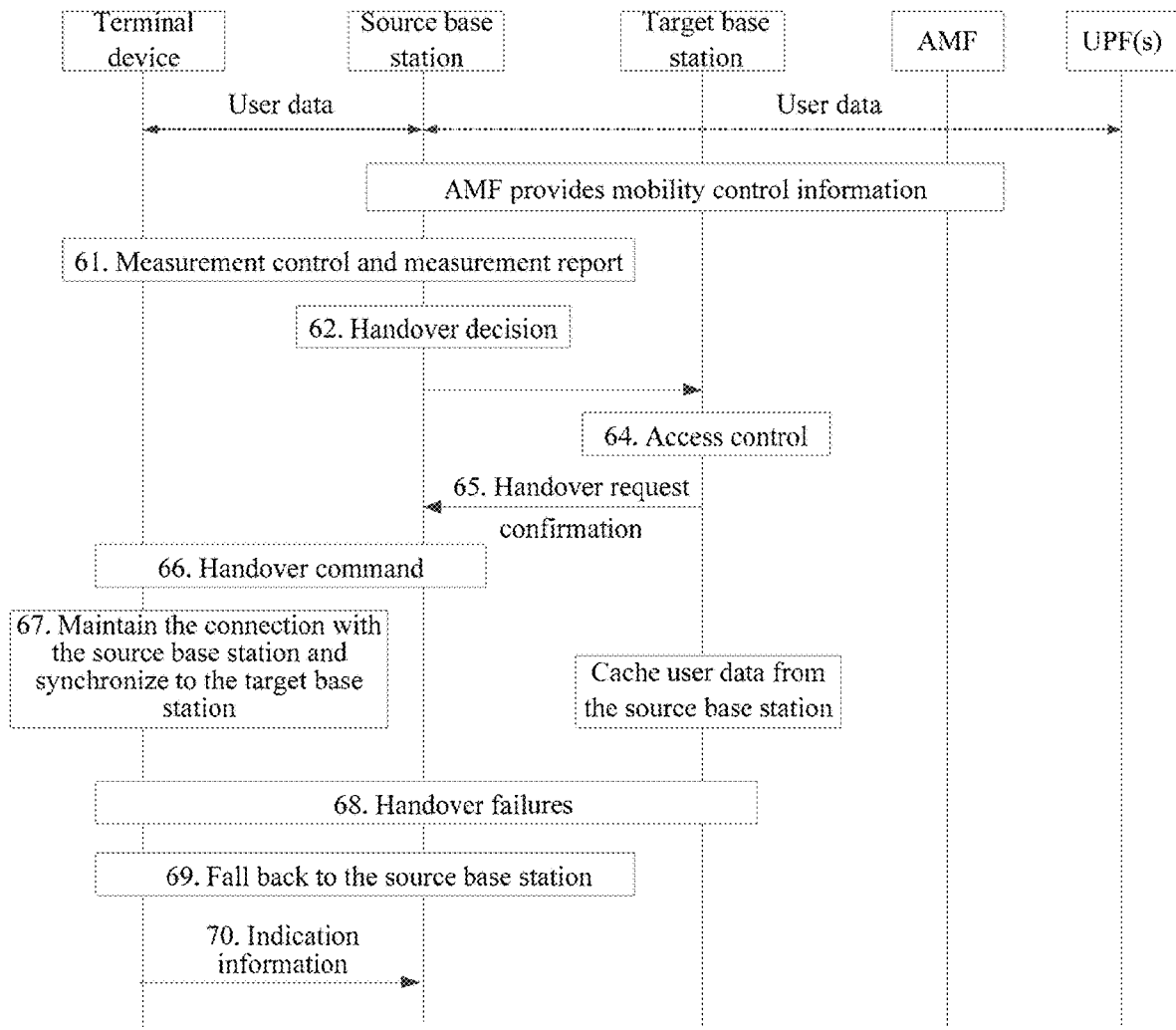
FIG. 6 shows a schematic interaction diagram of a wireless communication method according to another embodiment of the present application.
FIG. 7 shows a schematic flowchart of a wireless communication method according to another embodiment of the present application.

The embodiment shown in FIG. 6 may apply to the Conditional handover scenario shown in FIG. 3. As shown in FIG. 6, the method may include the following steps.

61 to 65 may correspond to 201 to 205 described in FIG. 2. For related description, please refer to the foregoing embodiment. For brevity, details are not repeated here.

Further, in 66, the source base station sends a handover command to the terminal device for indicating the terminal device to switch to the target base station.

In some embodiments, the handover command may include an identifier of at least one target base station and an access condition corresponding to the at least one target base station.

In 67, the terminal device maintains a connection with the source base station, monitors the configured target base station, and synchronizes to the target base station.

In some embodiments, the terminal device may maintain the connection of the radio bearer with the source base station, or suspend the connection of the radio bearer with the source base station.

For example, the terminal device may continue using the SRB to perform signaling interaction with the source base station, and suspend using the DRB to perform data interaction with the source base station.

For another example, the terminal device may continue using the SRB to perform signaling interaction with the source base station, and continue using the DRB to perform data interaction with the source base station.

For another example, the terminal device may suspend using the SRB for signaling interaction with the source base station, and suspend using the DRB for data interaction with the source base station.

The terminal device may monitor the configured target base station according to the access condition of the target base station included in the handover command, and determine whether the configured target base station meets the access condition.

In 68, the terminal device fails to switch to the target base station.

In 69, the terminal device falls back to the source base station.

In 70, the terminal device sends indication information to the source base station.

In some embodiments, if in 67, the terminal device suspends the connection of the radio bearer with the source base station, after 70, the source base station may also resume the suspended connection of the radio bearer with the terminal device.

For the specific implementation of the indication information, reference may be made to the relevant description above, which will not be repeated here.

In the foregoing, the wireless communication method is described in detail according to the embodiments of the present application from a perspective of a terminal device in conjunction with FIG. 4 to FIG. 6. The following describes a wireless communication method in detail according to another embodiment of the present application from a perspective of the network device in conjunction with FIG. 7. It should be understood that the description on the network device side and the description on the terminal device side correspond to each other, and reference may be made to the above for similar descriptions. To avoid repetition, details are not repeated herein.

FIG. 7 is a schematic flowchart of a wireless communication method 500 according to another embodiment of the present application. As shown in FIG. 7, the method 500 may include the following content:

S510: a first network device determines that a terminal device fails to switch to a second network device; and S520, the first network device maintains a connection with the terminal device.

In some embodiments, the first network device determines that the terminal device fails to switch to the second network device and the terminal device maintains the connection with the first network device includes:

the first network device receives the indication information sent by the terminal device, where the indication information is used to indicate that the terminal device fails to switch to the second network device.

In some embodiments, the indication information is included in at least one of the following signaling: radio resource control RRC signaling, a media access control MAC control element CE, and uplink control information UCI.

In some embodiments, the RRC signaling is newly added RRC signaling; or the MAC CE is a newly added MAC CE; or the UCI is newly added UCI.

In some embodiments, the RRC signaling is an RRC reconfiguration complete message, or the MAC CE is a scheduling request SR or a buffer status report BSR.

In some embodiments, the indication information is uplink control signaling.

In some embodiments, the uplink control signaling is an uplink RRC message or an uplink media access control MAC control element CE or UCI.

In some embodiments, the indication information is uplink data.

In some embodiments, the first network device determines that the terminal device fails to switch to the second network device and the terminal device maintains the connection with the first network device includes:

when a specific timer expires, the first network device determines that the terminal device fails to switch to the second network device, and the terminal device maintains the connection with the first network device.

In some embodiments, the specific timer is a T304 timer.

In some embodiments, the method further includes: during a process in which the terminal device is switched to the second network device, the first network device maintains the connection with the terminal device.

In some embodiments, the first network device maintains the connection with the terminal device includes:

the first network device continues using a radio bearer to communicate with the terminal device.

In some embodiments, the first network device maintains the connection with the terminal device includes:

the first network device suspends using a radio bearer to communicate with the terminal device.

In some embodiments, the first network device maintains the connection with the terminal device according to the indication information includes:

after receiving the indication information, the first network device resumes a connection of the radio bearer with the terminal device.

In some embodiments, the radio bearer includes a signaling radio bearer SRB and/or a data radio bearer DRB.

In some embodiments, the method further includes: the first network device sends a handover command to the terminal device, where the handover command is used to indicate the terminal device to switch to the second network device.

In some embodiments, the handover command includes an identifier of at least one target network device and an access condition corresponding to the at least one target network device, wherein the at least one target network device includes the second network device.

The method embodiments of the present application are described in detail above in conjunction with FIG. 2 to FIG. 7, and the device embodiments of the present application are described in detail below in conjunction with FIG. 8 to FIG. 12, reference may be made to the method embodiments for similar descriptions.

Figure 8:
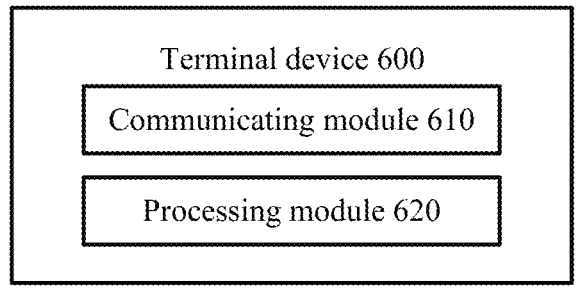
FIG. 8 shows a schematic block diagram of a terminal device according to an embodiment of the present application.

FIG. 8 shows a schematic block diagram of a terminal device 600 according to an embodiment of the present application. As shown in FIG. 8, the terminal device 600 includes:

a communicating module 610, configured to send indication information to the first network device, where the indication information is used to indicate that the terminal device fails to switch to the second network device.

In some embodiments, the indication information is included in at least one of the following signaling:

radio resource control RRC signaling, a media access control MAC control element CE and uplink control information UCI.

In some embodiments, the RRC signaling is newly added RRC signaling; or the MAC CE is a newly added MAC CE; or the UCI is newly added UCI.

In some embodiments, the RRC signaling is an RRC reconfiguration complete message, or the MAC CE is a scheduling request SR or a buffer status report BSR.

In some embodiments, the indication information is uplink control signaling.

In some embodiments, the uplink control signaling is an uplink RRC message or an uplink media access control MAC control element CE or UCI.

In some embodiments, the indication information is uplink data.

In some embodiments, the communicating module 610 is further configured to:

after receiving a handover command sent by the first network device, send the uplink data to the first network device, where the handover command is used to indicate the terminal device to switch from the first network device to the second network device.

In some embodiments, the communicating module 610 is further configured to:

send the uplink data to the first network device in a first time period after the terminal device receives the handover command sent by the first network device.

In some embodiments, the terminal device 600 further includes: a controlling module, configured to start a timer after the terminal device receives the handover command sent by the first network device;

the communicating module 610 is further configured to: send the uplink data to the first network device before the timer expires; wherein a time period during which the timer is in an on state corresponds to the first time period.

In some embodiments, the timer is configured to control a length of time for the terminal device to access the second network device, and/or to control an effective time for the terminal device to access a resource used by the second network device.

In some embodiments, the timer is a T304 timer.

In some embodiments, the terminal device further includes: a processing module 620, configured to maintain a connection with the first network device when the terminal device is switched to the second network device.

In some embodiments, the processing module 620 is specifically configured to:

control the communicating module to continue using a radio bearer to communicate with the first network device.

In some embodiments, the processing module 620 is specifically configured to:

control the communicating module to suspend using a radio bearer to communicate with the first network device.

In some embodiments, the radio bearer includes a signaling radio bearer SRB and/or a data radio bearer.

In some embodiments, the processing module 620 is further configured to:

in a process in which the terminal device is switched to the second network device, perform radio link monitoring RLM on the first network device to determine a wireless link condition of the first network device.

In some embodiments, the terminal device further includes: a determining module, configured to determine whether to switch to the first network device according to the wireless link condition of the first network device.

In some embodiments, the determining module is specifically configured to:

if the wireless link condition of the first network device meets a specific condition, determine to switch to the first network device.

In some embodiments, the communicating module 610 is further configured to:

receive a handover command sent by the first network device, where the handover command includes an identifier of at least one target network device and an access condition corresponding to the at least one target network device, where the at least one target network device includes the second network device.

In some embodiments, the communicating module 610 is further configured to:

if a channel quality of the second network device meets the access condition corresponding to the second network device, initiate a random access procedure to the second network device.

In some embodiments, the communicating module 610 is specifically configured to:

in a case where the terminal device fails in the random access procedure to the second network device, send the indication information to the first network device.

In some embodiments, the processing module 620 is further configured to:

before meeting one of the following conditions, keep performing RLM on the first network device:
the terminal device successfully sending a message 1 for random access to the second network device;
the terminal device successfully receiving a message 2 for random access sent by the second network device;
the terminal device successfully sending a message 3 for random access to the second network device;
the terminal device successfully receiving a message 4 for random access sent by the second network device.

It should be understood that the terminal device 600 according to the embodiment of the present application may correspond to the terminal device in the method embodiment of the present application, and the above and other operations and/or functions of each unit in the terminal device 600 are to implement the corresponding process of the terminal device in the method shown in FIG. 4. For the sake of brevity, details are not repeated here.

Figure 9:
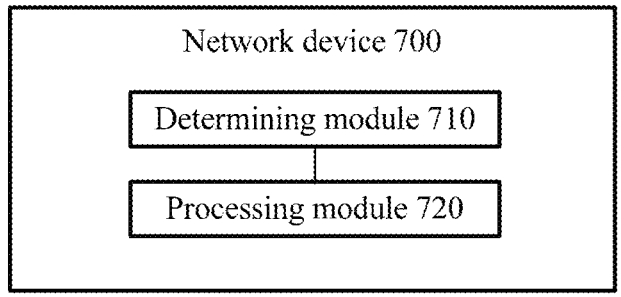
FIG. 9 shows a schematic block diagram of a network device according to an embodiment of the present application.

FIG. 9 is a schematic block diagram of a network device according to an embodiment of the present application. The network device 700 of FIG. 9 includes:

a determining module 710, configured to determine that a terminal device fails to switch to a second network device, where the terminal device maintains a connection with the network device;

a processing module 720, configured to maintain a connection with the terminal device.

In some embodiments, the network device further includes:

a communicating module, configured to receive indication information sent by the terminal device, where the indication information is used to indicate that the terminal device fails to switch to the second network device.

In some embodiments, the indication information is included in at least one of the following signaling:

radio resource control RRC signaling, a media access control MAC control element CE and uplink control information UCI.

In some embodiments, the RRC signaling is newly added RRC signaling; or the MAC CE is a newly added MAC CE; or the UCI is newly added UCI.

In some embodiments, the RRC signaling is an RRC reconfiguration complete message, or the MAC CE is a scheduling request SR or a buffer status report BSR.

In some embodiments, the indication information is uplink control signaling.

In some embodiments, the uplink control signaling is an uplink RRC message or an uplink media access control MAC control element CE or UCI.

In some embodiments, the indication information is uplink data.

In some embodiments, the determining module 710 is specifically configured to:

in a case where a specific timer expires, determine that the terminal device fails to switch to the second network device, where the terminal device maintains the connection with the network device.

In some embodiments, the specific timer is a T704 timer.

In some embodiments, the processing module 720 is specifically configured to: maintain the connection with the terminal device during a process in which the terminal device is switched to the second network device.

In some embodiments, the processing module 720 is specifically configured to:

control the communicating module to continue using a radio bearer to communicate with the terminal device.

In some embodiments, the processing module 720 is specifically configured to:

control the communicating module to suspend using a radio bearer to communicate with the terminal device.

In some embodiments, the processing module 720 is further configured to:

after receiving the indication information, resume a connection of the radio bearer with the terminal device.

In some embodiments, the radio bearer includes a signaling radio bearer SRB and/or a data radio bearer.

In some embodiments, the network device 700 further includes:

a communicating module, configured to send a handover command to the terminal device, where the handover command is used to indicate the terminal device to switch from the first network device to the second network device In some embodiments, the handover command includes an identifier of at least one target network device and an access condition corresponding to the at least one target network device, where the at least one target network device includes the second network device.

It should be understood that the network device 700 according to the embodiment of the present application may correspond to the first network device in the method embodiment of the present application, and the above-mentioned and other operations and/or functions of each unit in the network device 700 are to implement the corresponding process of the first network device in the method shown in FIG. 5. For the sake of brevity, details are not repeated here.

Figure 10:
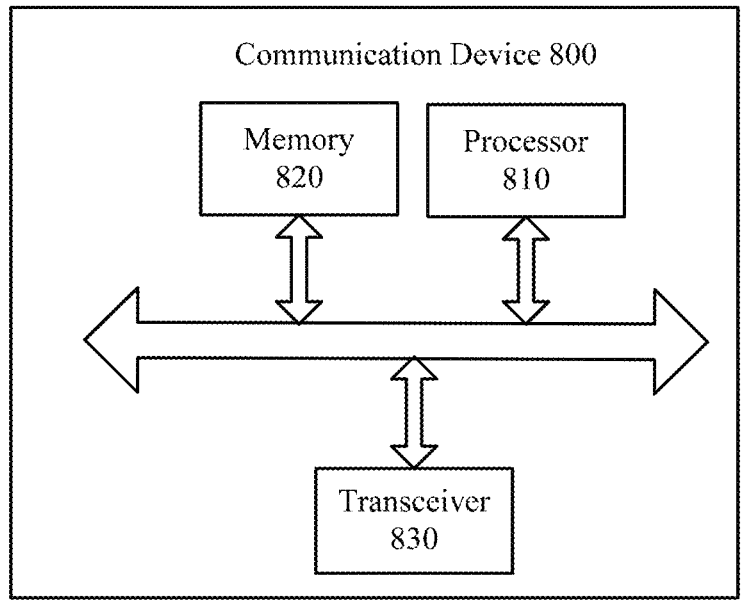
FIG. 10 shows a schematic block diagram of a communication device according to an embodiment of the present application.

FIG. 10 is a schematic structural diagram of a communication device 800 provided by an embodiment of the present application. The communication device 800 shown in FIG. 10 includes a processor 810, and the processor 810 can call and run a computer program from a memory to implement the method in the embodiment of the present application.

In some embodiments, as shown in FIG. 10, the communication device 800 may further include a memory 820, wherein the processor 810 can call and run a computer program from the memory 820 to implement the method in the embodiment of the present application.

The memory 820 may be a separate device independent from the processor 810, or may be integrated in the processor 810.

In some embodiments, as shown in FIG. 10, the communication device 800 may further include a transceiver 830, and the processor 810 may control the transceiver 830 to communicate with other devices. Specifically, it may send information or data to other devices, or receive information or data sent by other devices.

The transceiver 830 may include a transmitter and a receiver. The transceiver 830 may further include antennas, and the number of antennas may be one or more.

In some embodiments, the communication device 800 may specifically be the first network device of the embodiment of the present application, and the communication device 800 may implement the corresponding process implemented by the first network device in each method of the embodiment of the present application. For the sake of brevity, details are not repeated here.

In some embodiments, the communication device 800 may specifically be a mobile terminal/terminal device of the embodiment of the present application, and the communication device 800 may implement the corresponding process implemented by the mobile terminal/terminal device in each method of the embodiment of the present application. For the sake of brevity, details are not repeated here.

Figure 11:
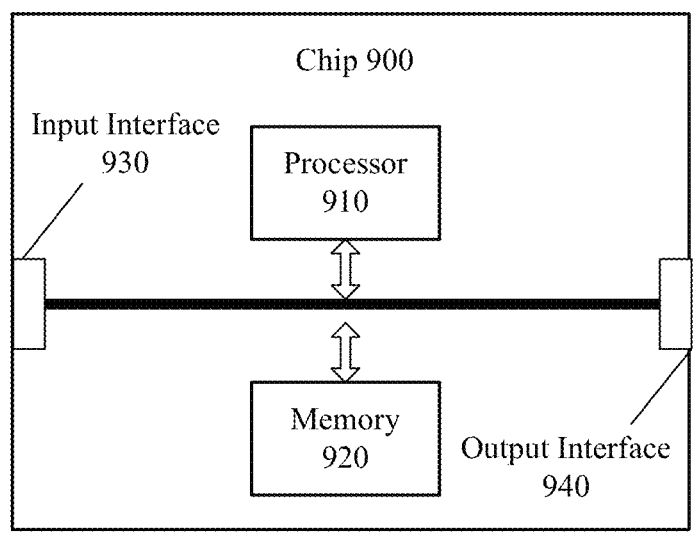
FIG. 11 shows a schematic block diagram of a chip according to an embodiment of the present application.

FIG. 11 is a schematic structural diagram of a chip according to an embodiment of the present application. The chip 900 shown in FIG. 11 includes a processor 910, and the processor 910 can call and run a computer program from a memory to implement the method in the embodiment of the present application.

Figure 12:
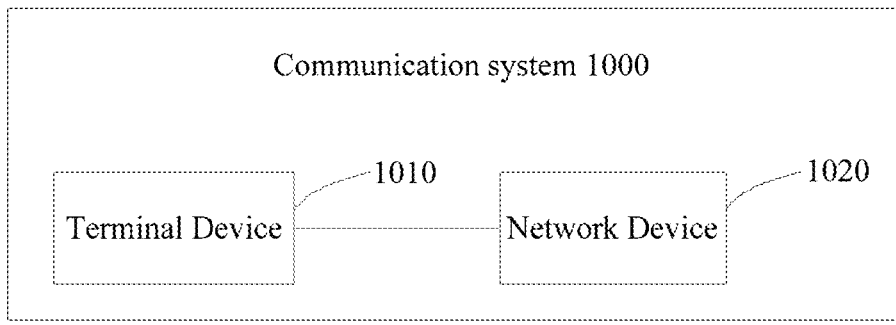
FIG. 12 shows a schematic block diagram of a communication system according to an embodiment of the present application.

In some embodiments, as shown in FIG. 12, the chip 900 may further include a memory 920. The processor 910 can call and run a computer program from the memory 920 to implement the method in the embodiment of the present application.

The memory 920 may be a separate device independent from the processor 910, or may be integrated in the processor 910.

In some embodiments, the chip 900 may further include an input interface 930. The processor 910 can control the input interface 930 to communicate with other devices or chips, and specifically, can acquire information or data sent by other devices or chips.

In some embodiments, the chip 900 may further include an output interface 940. The processor 910 can control the output interface 940 to communicate with other devices or chips, and specifically, can output information or data to other devices or chips.

In some embodiments, the chip can be applied to the first network device in the embodiment of the present application, and the chip can implement the corresponding process implemented by the first network device in each method of the embodiment of the present application. For the sake of brevity, details are not repeated here.

In some embodiments, the chip can be applied to the mobile terminal/terminal device in the embodiment of the present application, and the chip can implement the corresponding process implemented by the mobile terminal/terminal device in each method of the embodiment of the present application. For the sake of brevity, details are not repeated here.

It should be understood that the chip mentioned in the embodiment of the present application may also be referred to as a system-level chip, a system chip, a chip system, or a system-on-chip, etc.

FIG. 12 is a schematic block diagram of a communication system 1000 according to an embodiment of the present application. As shown in FIG. 12, the communication system 1000 includes a terminal device 1010 and a network device 1020.

The terminal device 1010 can be configured to implement the corresponding function implemented by the terminal device in the above method, and the network device 1020 can be configured to implement the corresponding function implemented by the network device in the above method. For brevity, it will not be repeated here.

It should be understood that the processor of the embodiment of the present application may be an integrated circuit chip with signal processing functions. In an implementation process, the steps of the above method embodiments can be completed by hardware integrated logic circuits in the processor or instructions in the form of software. The above processor can be a general-purpose processor, a digital signal processor (DSP), an application specific integrated circuit (ASIC), a ready-made programmable gate array (FPGA) or other programmable logic devices, discrete gates or transistor logic devices, discrete hardware components. The methods, steps, and logical block diagrams disclosed in the embodiments of the present application can be implemented or executed. The general-purpose processor may be a microprocessor or the processor may also be any conventional processor or the like. The steps of the method disclosed in the embodiments of the present application may be directly embodied as being executed and completed by a hardware decoding processor, or executed and completed by a combination of hardware and software modules in the decoding processor. The software module can be located in a mature storage medium in the field, such as a random access memory, a flash memory, a read-only memory, a programmable read-only memory, or an electrically erasable programmable memory, a register and the like. The storage medium is located in the memory, and the processor reads information in the memory and completes the steps of the above method in combination with hardware thereof.

It can be understood that the memory in the embodiments of the present application may be a volatile memory or a non-volatile memory, or may include both volatile and non-volatile memories. The non-volatile memory can be a read-only memory (ROM), a programmable read-only memory (PROM), an erasable programmable read-only memory (EPROM), and an electrically erasable programmable read-only memory (EEPROM) or a flash memory. The volatile memory may be a random access memory (RAM), which is used as an external cache. By way of exemplary but not restrictive description, many forms of RAMs are available, such as a static random access memory (SRAM), a dynamic random access memory (DRAM), a synchronous dynamic random access memory (SDRAM), a double data rate SDRAM (DDR SDRAM), an enhanced synchronous dynamic random access memory (ESDRAM), a synchronous link dynamic random access memory (SLDRAM) and a direct rambus random access memory (DR RAM). It should be noted that the memories of the systems and methods described herein are intended to include, but are not limited to these and any other suitable types of memories.

It should be understood that the above memory is exemplary but not restrictive description. For example, the memory in the embodiment of the present application may also be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link DRAM (SLDRAM) and a direct memory bus random access memory (DR RAM), and the like. That is to say, the memory in the embodiments of the present application is intended to include, but is not limited to these and any other suitable types of memory.

The embodiments of the present application also provide a computer readable storage medium configured to store a computer program.

In some embodiments, the computer readable storage medium may be applied to the network device in the embodiment of the present application, and the computer program enables the computer to implement the corresponding process implemented by the network device in each method of the embodiment of the present application. For the sake of brevity, details are not repeated here.

In some embodiments, the computer readable storage medium may be applied to the mobile terminal/terminal device in the embodiment of the present application, and the computer program enables the computer to implement the corresponding process implemented by the mobile terminal/terminal device in each method of the embodiment of the present application. For the sake of brevity, details are not repeated here.

The embodiments of the present application also provide a computer program product, including computer program instructions.

In some embodiments, the computer program product may be applied to the network device in the embodiment of the present application, and the computer program instructions cause the computer to implement the corresponding process implemented by the network device in each method of the embodiment of the present application. For the sake of brevity, details are not repeated here.

In some embodiments, the computer program product can be applied to the mobile terminal/terminal device in the embodiment of the present application, and the computer program instructions cause the computer to implement the corresponding process implemented by the mobile terminal/terminal device in each method of the embodiment of the present application. For the sake of brevity, details are not repeated here.

The embodiment of the present application also provides a computer program.

In some embodiments, the computer program can be applied to the network device in the embodiment of the present application. When the computer program runs on a computer, it causes the computer to execute the corresponding process implemented by the network device in each method of the embodiment of the present application. For the sake of brevity, details are not repeated here.

In some embodiments, the computer program can be applied to the mobile terminal/terminal device in the embodiment of the present application. When the computer program runs on a computer, it causes the computer to execute the corresponding process implemented by the mobile terminal/terminal device in each method of the embodiment of the present application. For the sake of brevity, details are not repeated here.

Those skilled in the art may realize that the units and algorithm steps of the examples described in conjunction with the embodiments disclosed herein can be implemented by electronic hardware or a combination of computer software and electronic hardware. Whether these functions are performed in hardware or software depends on specific applications and design constraints of the technical solution. A person skilled in the art may use different methods for each specific application to implement the described functions, but such implementation should not be considered beyond the scope of the present application.

Those skilled in the art may clearly understand that, for the convenience and brevity of the description, reference may be made to the corresponding processes in the above method embodiments for specific operation processes of the systems, the apparatuses and the units described above, and details will not be described herein again.

In the several embodiments provided in the present application, it should be understood that the disclosed systems, apparatuses, and methods may be implemented in other manners. For example, the apparatus embodiments described above are merely illustrative. For example, the division of the units is only a logical function division. In an actual implementation, there may be another division manner. For example, multiple units or components may be combined or may be integrated into another system, or some features may be ignored or not executed. In addition, a coupling or direct coupling or communication connection shown or discussed may be an indirect coupling or communication connection through some interfaces, apparatuses or units, and may be electrical, mechanical or otherwise.

The units described as separate components may or may not be physically separated, and the components shown as units may or may not be physical units, that is, may be located in one place, or may be distributed to multiple network units. Some or all of the units may be selected according to actual needs to achieve the purpose of the solution of the embodiments.

In addition, the functional units in the embodiments of the present application may be integrated into one processing unit, or each of the units may exist alone physically, or two or more units may be integrated in one unit.

The functions may be stored in a computer readable storage medium if being implemented in the form of a software functional unit and sold or used as a standalone product. Based on such understanding, the essence of the technical solution of the present application, or a part of the technical solution of the present application contributing to the prior art, or a part of the technical solution may be embodied in the form of a software product which is stored in a storage medium, including instructions for enabling a computer device (which may be a personal computer, a server, or the network device, etc.) to perform all or part of the steps of the methods described in the embodiments of the present application. The above storage medium includes: various mediums capable of storing program codes, such as a USB flash disk, a mobile hard disk, a read-only memory (ROM), a random access memory (RAM), a magnetic disk, an optical disk, or the like.

The above description is only specific embodiments of the present application, but the protection scope of the present application is not limited thereto. Any modification or substitution conceived by persons skilled in the art within the technical scope of the present application should be covered in the protection scope of the present application. Therefore, the protection scope of the present application is subject to the protection scope of the appended claims.

What is claimed is:

1. A wireless communication method, comprising:
when a terminal device accesses a target network device, maintaining, by the terminal device, a data radio bearer (DRB) connection with source network device, and suspending a signaling radio bearer (SRB) connection with the source network device;
after the terminal device fails to switch to the target network device,
sending, by the terminal device, indication information to the source network, wherein the indication information is used to indicate that the terminal device fails to switch to the target network device;
determining, by the terminal device, that the SRB connection between the terminal device and the source network device is resumed; and
falling back, by the terminal device, to the source network device to continue using the DRB connection and the SRB connection with the source network device for communication.

2. The method according to claim 1, wherein the indication information is comprised in a radio resource control (RRC) signaling.

3. The method according to claim 1, wherein the method further comprises:
in a process in which the terminal device is switched to the target network device, performing, by the terminal device, radio link monitoring (RLM) on the source network device to determine a wireless link condition of the source network device.

4. A terminal device, comprising: a processor, a memory, and a transceiver, wherein the memory is configured to store a computer program, and the processor is configured to call and run the computer program stored in the memory to:
when a terminal device accesses a target network device, maintain a data radio bearer (DRB) connection with a source network device, and suspend a signaling radio bearer (SRB connection with the terminal device;
after the terminal device fails to switch to the target network device,
control the transceiver to send indication information to the source network device, the indication information being used to indicate that the terminal device fails to switch to the target network device;
determine, by the terminal device, that the SRB connection between the terminal device and the source network device is resumed; and
fall back, by the terminal device, to the source network device to continue using the DRB connection and the SRB connection with the source network device for communication.

5. The terminal device according to claim 4 wherein the indication information is comprised in a radio resource control (RRC) signaling.

6. The terminal device according to claim 4, wherein the processor is further configured to:
in a process in which the terminal device is switched to the target network device, perform radio link monitoring (RLM) on the source network device to determine a wireless link condition of the source network device.

7. A source network device, comprising: a processor, a memory, and a transceiver, wherein the memory is configured to store a computer program, and the processor is configured to call and run the computer program stored in the memory to:
when a terminal device accesses a target network device, maintain a data radio bearer (DRB) connection with the terminal device, and suspend a signaling radio bearer (SRB connection with the terminal device;
after the terminal device fails to switch to the target network device,
receive indication information sent by the terminal device, the indication information being used to indicate that the terminal device fails to switch to the target network device;
determine that the terminal device fails to access the target network device;
resume the SRB connection between the terminal device and the source network device; and
continue using the DRB connection and the SRB connection with the terminal device for communication.

8. The source network device according to claim 7, wherein the indication information is comprised in a radio resource control (RRC) signaling.

* * * * *